(12) United States Patent
Bolivar et al.

(10) Patent No.: US 8,181,996 B2
(45) Date of Patent: May 22, 2012

(54) ROTATING UNION

(75) Inventors: Daniel Mark Bolivar, Dartmouth (CA); Peter Foster Allen, Bedford (CA); Michael Ray Doyle, Halifax (CA)

(73) Assignee: Nova Scotia Community College, Dartmouth, Nova Scotia (CA)

(*) Notice: Subject to any disclaimer, the term of this patent is extended or adjusted under 35 U.S.C. 154(b) by 527 days.

(21) Appl. No.: 12/368,870

(22) Filed: Feb. 10, 2009
(Under 37 CFR 1.47)

(65) Prior Publication Data
US 2010/0201120 A1   Aug. 12, 2010

(51) Int. Cl.
*F16L 27/00* (2006.01)

(52) U.S. Cl. .......... 285/272; 285/98; 285/190; 285/275; 285/278; 285/901

(58) Field of Classification Search .............. 285/98, 285/121.3, 121.6, 190, 201–204, 272, 272.1, 285/273, 275, 278, 345, 901, 912
See application file for complete search history.

(56) References Cited

U.S. PATENT DOCUMENTS

| | | | |
|---|---|---|---|
| 1,210,615 A * | 1/1917 | Double | 285/18 |
| 1,653,708 A * | 12/1927 | Howie | 285/275 |
| 1,985,012 A * | 12/1934 | Boehm | 285/190 |
| 2,083,599 A * | 6/1937 | Fox | 285/98 |
| 2,322,877 A * | 6/1943 | Parker | 251/149.6 |
| 2,344,739 A * | 3/1944 | Shaff | 251/149.5 |
| 2,489,441 A * | 11/1949 | Warren | 285/98 |
| 2,518,216 A * | 8/1950 | Barker | 285/98 |
| RE23,283 E * | 10/1950 | Browne | 285/98 |
| 2,626,166 A * | 1/1953 | Fawick | 285/121.3 |
| 2,812,960 A * | 11/1957 | Walsh | 285/276 |
| 2,933,321 A * | 4/1960 | Cascone | 279/20 |
| 3,633,566 A | 1/1972 | Grabhorn | |
| 3,811,442 A | 5/1974 | Maroth | |
| 4,787,893 A | 11/1988 | Villette | |
| 6,183,442 B1 | 2/2001 | Athanasiou et al. | |
| 6,245,043 B1 | 6/2001 | Villette | |
| 6,387,077 B1 | 5/2002 | Klibanov et al. | |
| 6,475,192 B1 | 11/2002 | Reilly et al. | |
| 6,821,013 B2 | 11/2004 | Reilly et al. | |
| 2004/0220472 A1 | 11/2004 | Harui et al. | |
| 2005/0234337 A1 | 10/2005 | Browne | |

* cited by examiner

*Primary Examiner* — Aaron Dunwoody
*Assistant Examiner* — Fannie Kee
(74) *Attorney, Agent, or Firm* — Steven M. Greenberg, Esq.; Carey Rodriguez Greenberg & O'Keefe, LLP (57) ABSTRACT

A rotating union (10) comprises a housing (12), a bushing (14), a fluid conduit (16), an annular seal (18) and a cap (20) secured to the housing and having a fluid inlet. The bushing is received within a cylindrical recess (32) in the housing, and the fluid conduit is rotatably received by the bushing and passes through the bushing and a bore (40) in the housing. The annular seal is received within the housing recess, and sealingly engages a cylindrical outer surface (80) of the fluid conduit and the cylindrical wall (46) of the housing recess. The cap has a circular recess (104) and surrounding annular projection (106) which receives the input end of the fluid conduit. The annular seal is sandwiched between the bushing and the annular projection. When the fluid conduit rotates, its outer surface rotates under friction against the annular seal to maintain the seal.

11 Claims, 9 Drawing Sheets

ROTATING UNION

FIELD OF INVENTION

The present invention relates to rotating unions, and more particularly to rotating unions useful in medical applications.

BACKGROUND OF THE INVENTION

In certain applications involving fluid transfer, it may be necessary to move fluid from a static fluid passage to a rotating fluid passage. For example, in neural transplantation, a cannula is inserted into a patient's brain and carefully and precisely rotated, often through several revolutions. An example of such a neural transplantation system is described in Canadian Patent No. 2,282,007 and U.S. Pat. No. 7,137,969.

For such applications in which fluid is to move from a static fluid passage to a rotating fluid passage, it is desirable to have a rotating union for sealingly coupling the static fluid passage to the rotating fluid passage.

SUMMARY OF THE INVENTION

In one aspect, the present invention is directed to a rotating union. The rotating union has an input end and an output end relative to a fluid flow direction therethrough.

The rotating union comprises a housing having an input end and an output end relative to the fluid flow direction, and has a mounting structure for mounting the housing to a support. A housing cylindrical recess is defined in the housing. The housing cylindrical recess opens at the input end of the housing and extends axially along the interior of the housing to terminate at an end face adjacent the output end of the housing. A bore is defined through the end face of the housing at the output end thereof so that the bore is co-axial with the cylindrical recess and communicates therewith. The bore has a diameter $D_{HB}$ and the housing cylindrical recess has a diameter $D_{HCR}$ that is larger than the bore diameter $D_{HB}$ so that the housing cylindrical recess and the bore cooperate to define an interior surface of the end face as a housing annular shoulder between the bore and the housing cylindrical recess.

The rotating union further comprises a cylindrical low-friction bushing received within the housing cylindrical recess. The bushing has an input end and an output end relative to the fluid flow direction and a co-axial bushing recess defined therein, with the bushing recess comprising a cylindrical input end portion having a first diameter $D_{B1}$ and a cylindrical output end portion having a second diameter $D_{B2}$, with $D_{B1}$ being larger than $D_{B2}$ so as to define a bushing annular shoulder between the input end portion and the output end portion of the bushing recess. The bushing has an output end surface abutting the housing annular shoulder.

The rotating union further comprises a fluid conduit having an input end and an output end relative to the fluid flow direction and passing through the bushing and the bore in rotatable engagement therewith. The output end of the fluid conduit is downstream of the bore, relative to the fluid flow direction, the fluid conduit is supported by the bushing so as to be rotatable therewithin, and the fluid conduit has an external shoulder defined part-way along its axial length which engages the bushing annular shoulder.

The rotating union further comprises an annular seal having an input side and an output side relative to the fluid flow direction. The annular seal is received within the housing cylindrical recess at the input end thereof and has its output side engaging an input end surface of the bushing. An inner annular engagement surface of the annular seal sealingly engages a cylindrical outer surface of an input portion of the fluid conduit and an outer annular engagement surface of the annular seal sealingly engages a cylindrical wall of the housing cylindrical recess at the input end thereof.

The rotating union further comprises a cap having an input side and an output side relative to the fluid flow direction. The cap has a circular recess defined in the output side thereof for receiving the input end of the fluid conduit in rotatable engagement therewith and an annular projection surrounding the circular recess and having an outer diameter $D_{AP}$ corresponding to a diameter $D_{HCR}$ of the housing cylindrical recess. An engagement surface of the annular projection sealingly engages the input side of the annular seal. The input side of the cap is adapted to be coupled to a fluid source so that fluid can flow, via the cap, into the circular recess and into the input end of the fluid conduit. The cap is removably and non-rotatably secured to the input end of the housing so as to maintain respective axial positions of the annular seal, cylindrical bushing and fluid conduit inside the housing.

When the fluid conduit rotates within the bushing, the cylindrical outer surface of the input portion of the fluid conduit rotates under friction against the inner annular engagement surface of the annular seal so that sealing engagement therebetween is maintained.

In one embodiment, the rotating union of claim 1 further comprises a fluid conduit drive wheel coaxially fixed to an outer surface of the fluid conduit at a position downstream from the output end of the housing. In one particular implementation, a rotary motor having a drive shaft whose axis of rotation is parallel to the fluid flow direction has a motor drive wheel that is drivingly coupled to the fluid conduit drive wheel so that the rotary motor is operable to rotate the fluid conduit relative to the housing. In one example of such an implementation, the motor drive wheel is drivingly coupled to the fluid conduit drive wheel by a belt. In another example of such an implementation, the motor drive wheel and the fluid conduit drive wheel have intermeshing outer gear surfaces.

In an embodiment, the bushing is non-rotatably received within the cylindrical recess. In a particular embodiment, the fluid conduit comprises the input portion, which has an outer diameter $D_{FCI}$, as well as an output portion and an intermediate portion disposed between the input portion and the output portion and having an outer diameter $D_{FCM}$, in which the outer diameter $D_{FCI}$ of the input portion is larger than the outer diameter $D_{FCM}$ of the intermediate portion and the transition therebetween is abrupt so as to define the external annular shoulder on the fluid conduit.

In an embodiment, the cap includes a fluid input stem projecting from the input side and a fluid passageway defined through the fluid input stem which is in fluid communication with the circular recess.

In an embodiment, the output end of the fluid conduit is adapted to receive a luer lock.

The bushing may be a polymer bushing, and the annular seal may be a lip seal whose high pressure side faces the input end of the housing.

BRIEF DESCRIPTION OF THE DRAWINGS

These and other features of the invention will become more apparent from the following description in which reference is made to the appended drawings wherein.

DETAILED DESCRIPTION

For ease of reference, a listing of parts is provided at the end of the description.

Figure 1A:
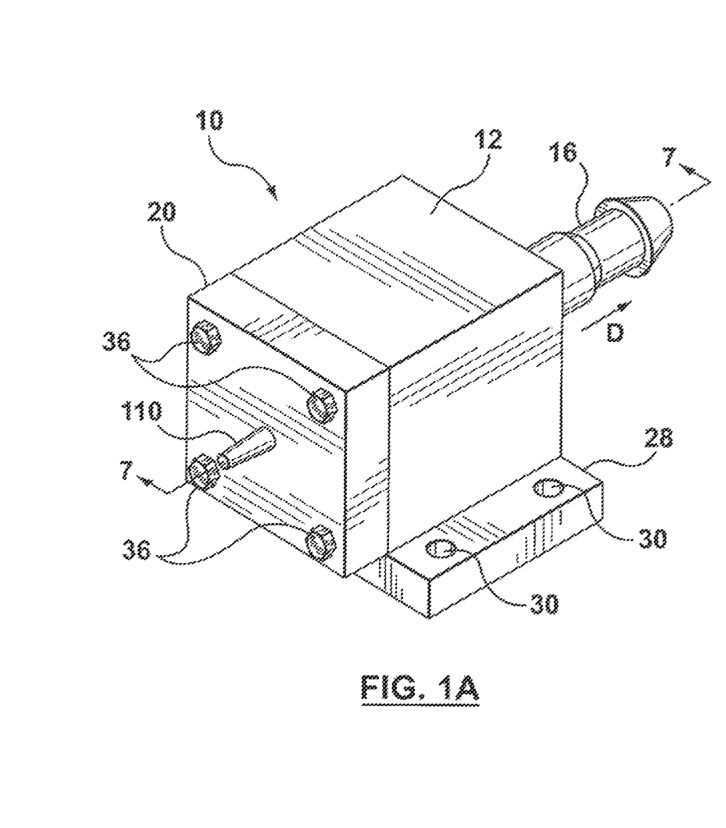
FIG. 1A shows a perspective view of an embodiment of a rotating union in accordance with an aspect of the present invention, from an input end thereof.
Figure 1B:
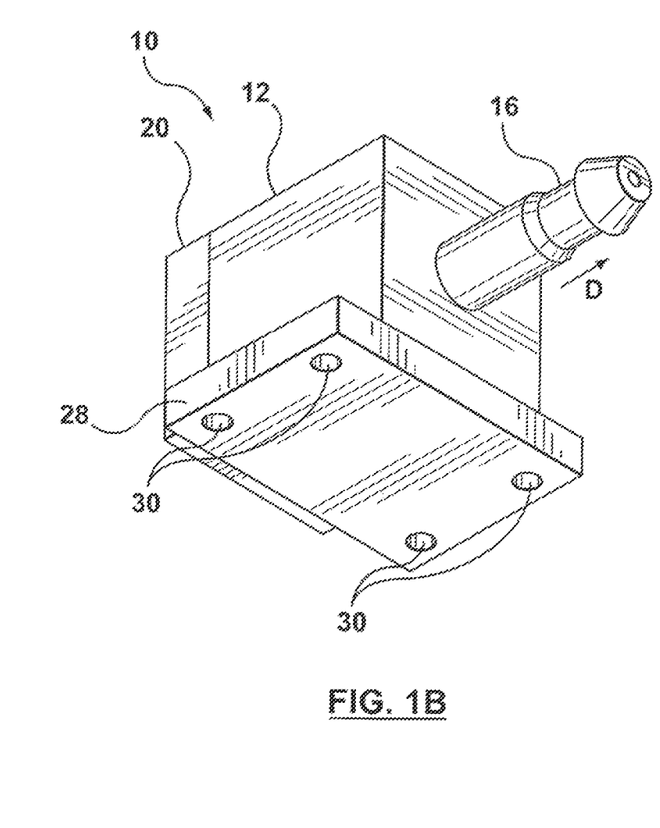
FIG. 1B shows a perspective view of the rotating union of FIG. 1A, from an output end thereof.
Figure 1C:
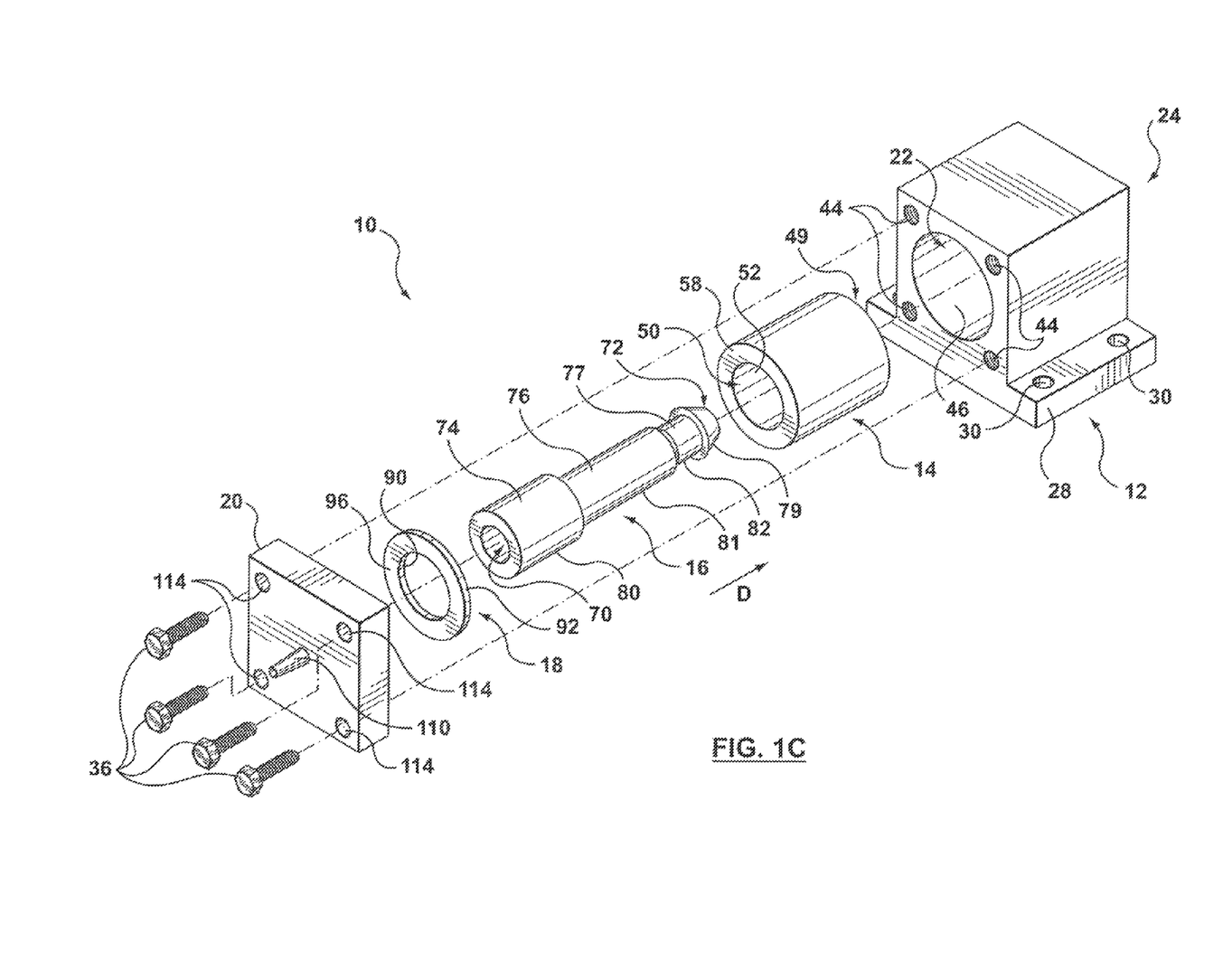
FIG. 1C shows an exploded perspective view of the rotating union of FIG. 1A.

With reference now to FIGS. 1A and 1B, an exemplary rotating union according to an aspect of the present invention is shown generally at 10. The rotating union 10 has an axial fluid flow direction "D" so that the rotating union 10 overall, as well as each component thereof, may be considered to have a respective input end and output end, relative to the fluid flow direction D. As best seen in FIG. 1C, the rotating union 10 comprises a housing 12, a cylindrical low-friction bushing 14, a fluid conduit 16, an annular seal 18, and a cap 20. Each of these components is described in greater detail below.

Figure 2A:
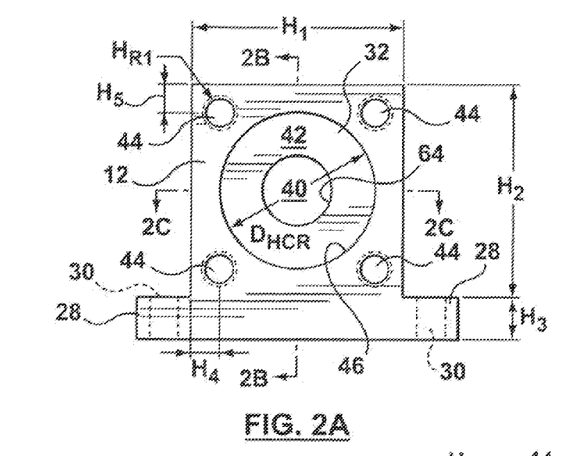
FIG. 2A shows a view from the input end of a housing of the rotating union of FIG. 1A.
Figure 2B:
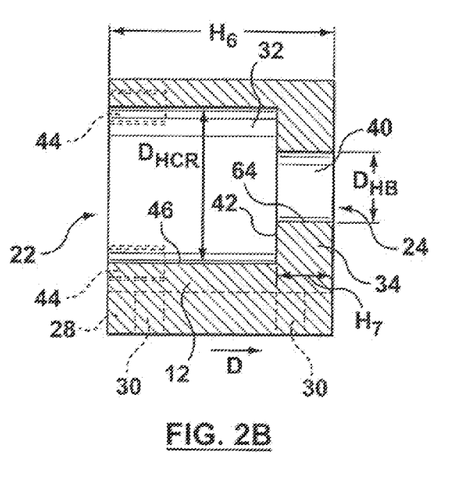
FIG. 2B shows a cross-sectional view of the housing of FIG. 2A, taken along the line 2B-2B in FIG. 2A.
Figure 2C:
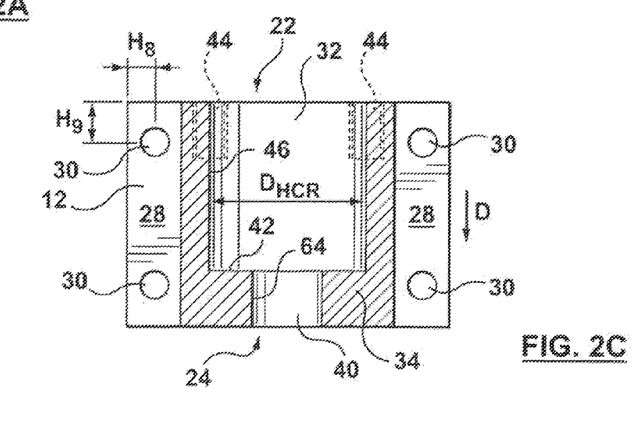
FIG. 2C shows a cross-sectional view of the housing of FIG. 2A, taken along the line 2C-2C in FIG. 2A.

Reference is now made to FIGS. 2A to 2C, which provide a detailed view of the housing 12. As indicated above, the housing 12 has an input end 22 and an output end 24 (FIGS. 2B and 2C), relative to the direction "D" of fluid flow. The housing 12 has a mounting structure for mounting the housing 12 to a support (not shown), which support would typically carry a bracket for receiving a rotary motor. In the illustrated embodiment, the housing 12 has a generally rectangular prismatic shape, with the mounting structure taking the form of two wing members 28 extending outwardly from opposed edges of one face of the housing 12. The wing members 28 each have two apertures 30 defined therein for receiving fasteners (not shown) which secure the housing 12 to a support (also not shown).

Figure 7:
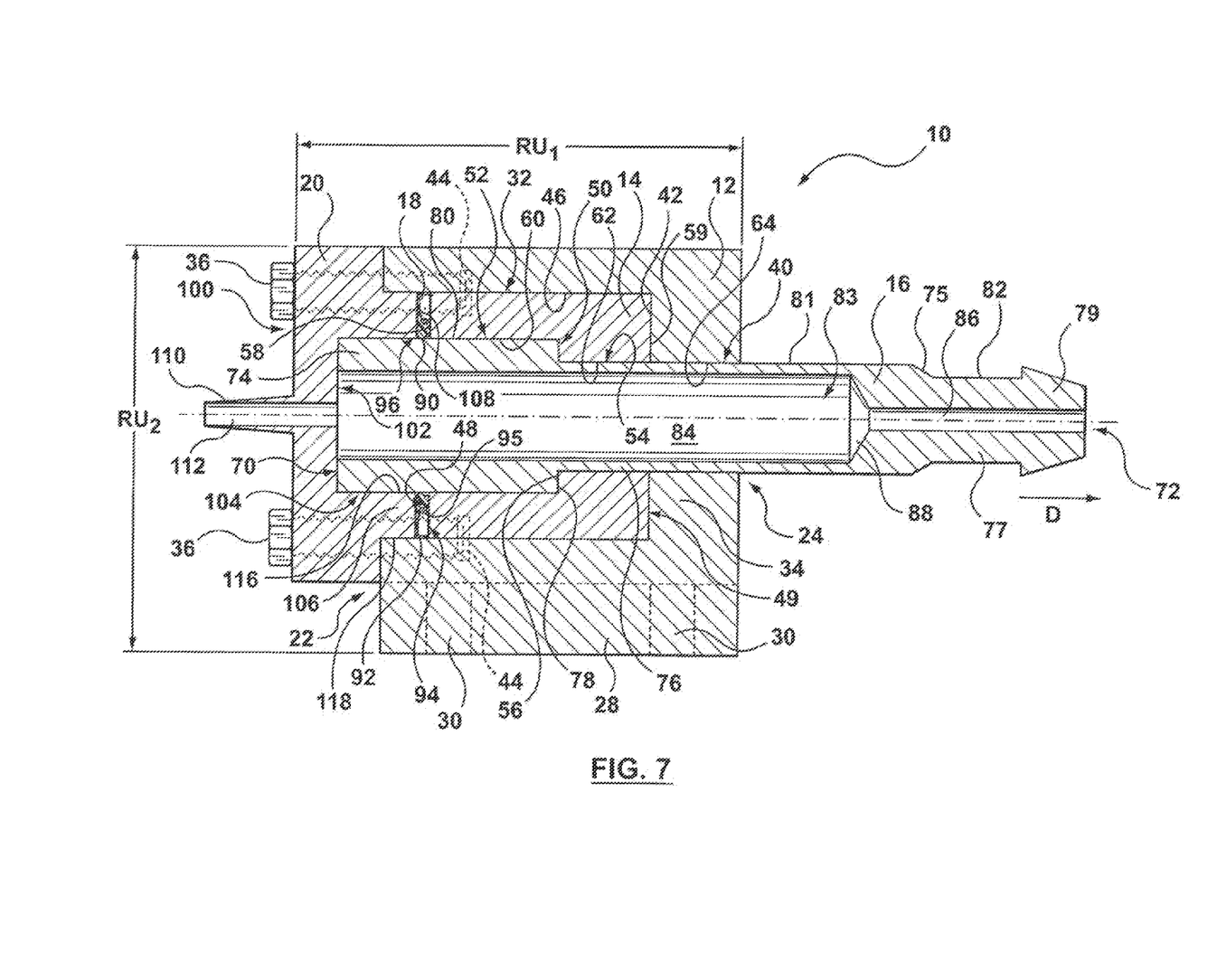
FIG. 7 shows a cross-sectional view of the rotating union of FIG. 1A; taken along the line 7-7 in FIG. 1A.

The housing 12 has a cylindrical recess 32 defined therein, which is open at the input end 22 of the housing 12, and extends axially (i.e. along an axis parallel to the direction of fluid flow D) along the interior of the housing 12 to terminate at an end face 34 adjacent the output end 24 of the housing 12. The housing cylindrical recess 32 has a diameter $D_{HCR}$. A bore 40 is defined at the output end 24 through the end face 34 of the housing 12 so as to be coaxial with the cylindrical recess 32 and in fluid communication therewith. The diameter $D_{HCR}$ of the cylindrical recess 32 is larger than the diameter $D_{HB}$ of the bore 40, and the input side surface of the end face 34 thus defines an annular shoulder 42 between the cylindrical recess 32 and the bore 40. Four receiving holes 44 are defined in the input end 22 of the housing 12 at the corners thereof, which receiving holes 44 are adapted to receive fasteners 36 (FIGS. 1A and 1C; FIG. 7) for securing the cap 20 (FIGS. 1A to 1C; FIG. 7) to the input end 22 of the housing 12. In one embodiment, the receiving holes 44 are threaded so that they can receive correspondingly threaded fasteners 36 (FIG. 1C). In an exemplary embodiment, the receiving holes 44 have a depth of 0.2500 inches.

FIGS. 2A to 2C show various dimensions of the housing 12, indicated by references $H_1$ to $H_9$, $H_{R1}$, $D_{HB}$ and $D_{HCR}$. In an exemplary embodiment, these dimensions are as indicated in the table below:

| Reference | Dimension (inches) |
|---|---|
| $H_1$ | 0.938 |
| $H_2$ | 0.938 |
| $H_3$ | 0.188 |
| $H_4$ | 0.125 |
| $H_5$ | 0.125 |
| $H_6$ | 1.000 |
| $H_7$ | 0.250 |
| $H_8$ | 0.125 |
| $H_9$ | 0.188 |
| $H_{R1}$ | Receives #4 machine screw |
| $D_{HB}$ | 0.310 |
| $D_{HCR}$ | 0.688 |

Figure 3A:
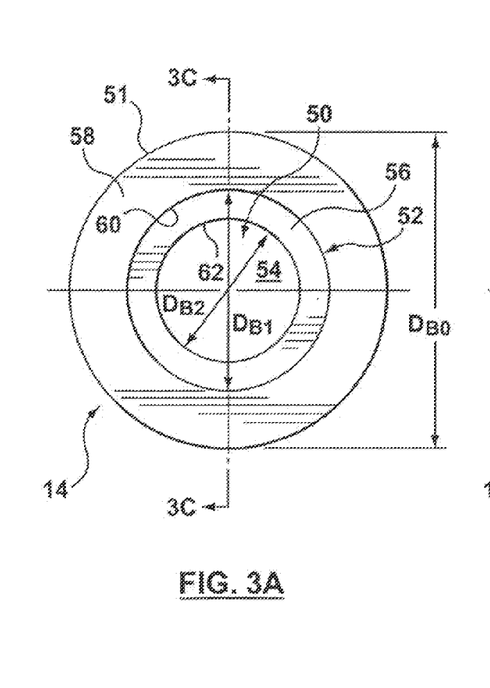
FIG. 3A shows a view from the input end of a bushing of the rotating union of FIG. 1A.
Figure 3B:
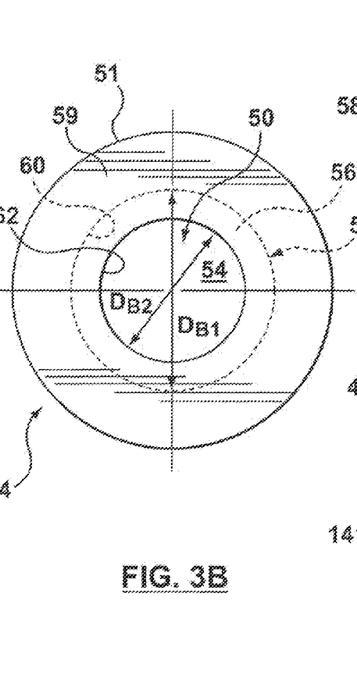
FIG. 3B shows a view from the output end of a bushing of the rotating union of FIG. 1A.
Figure 3C:
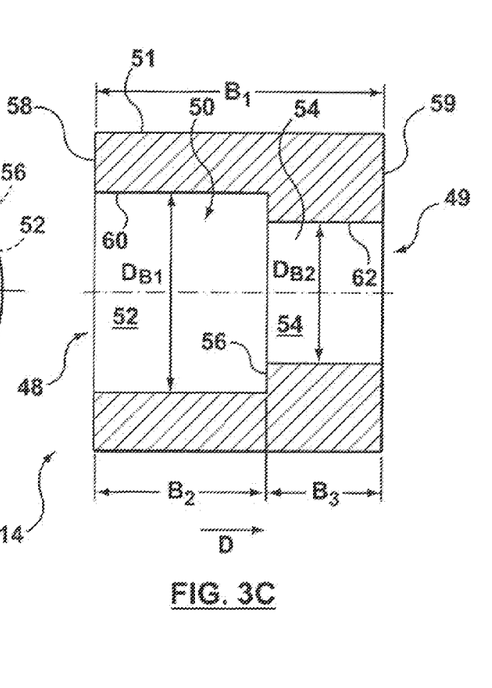
FIG. 3C shows a cross-sectional view of the bushing of FIG. 3A, taken along the line 3C-3C in FIG. 3A.

With reference now to FIGS. 3A to 3C, the cylindrical low-friction bushing 14 is shown in greater detail. In one embodiment, the bushing 14 is a polymer bushing. The bushing 14 has an input end 48 and an output end 49 (FIG. 3C), and has an input end surface 58 and an output end surface 59. The bushing 14 has a co-axial bushing recess 50 defined therein, which is made up of two portions. More particularly, the bushing recess 50 comprises a cylindrical input end portion 52 having a first diameter $D_{B1}$ and a cylindrical output end portion 54 having a second diameter $D_{B2}$, with $D_{B1}$ being larger than $D_{B2}$. As such, the input end portion 52 and the output end portion 54 of the bushing recess 50 cooperate with one another so as to define a bushing annular shoulder 56 between the input end portion 52 and the output end portion 54.

FIGS. 3A to 3C show various dimensions of the bushing 14, indicated by references $B_1$ to $B_3$, $D_{BO}$ and $D_{B1}$ and $D_{B2}$. In an exemplary embodiment, these dimensions are as indicated in the table below:

| Reference | Dimension (inches) |
|---|---|
| $B_1$ | 0.625 |
| $B_2$ | 0.250 |
| $B_3$ | 0.375 |
| $D_{BO}$ | 0.688 |
| $D_{B1}$ | 0.438 |
| $D_{B2}$ | 0.310 |

Figure 4A:
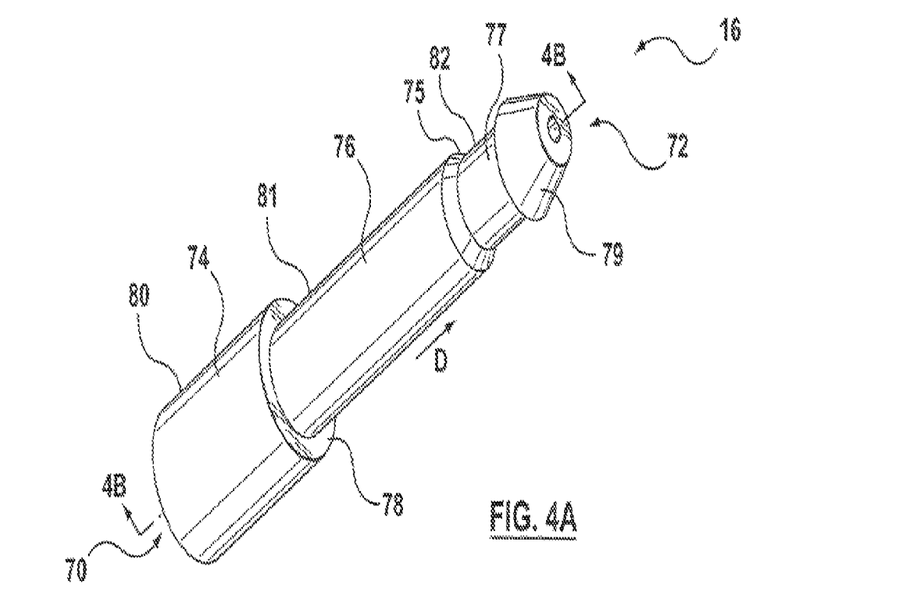
FIG. 4A shows a perspective view of a fluid conduit of the rotating union of FIG. 1A.
Figure 4B:
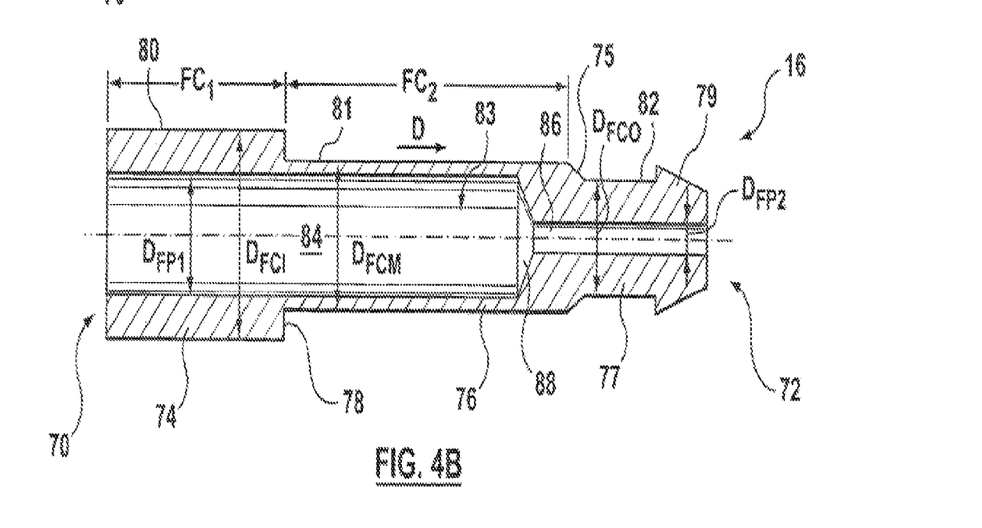
FIG. 4B shows a cross-sectional view of the fluid conduit of FIG. 4A, taken along the line 4B-4B in FIG. 4A.

With reference now to FIGS. 4A and 4B, the fluid conduit 16 is shown in more detail. The fluid conduit 16 has an input end 70 and an output end 72, again relative to the fluid flow direction D.

In the illustrated embodiment, the fluid conduit 16 comprises an input portion 74 having an outer diameter $D_{FCI}$, an output portion 77 having a main diameter $D_{FCO}$, and an intermediate portion 76 disposed between the input portion 74 and the output portion 77 and having an outer diameter $D_{FCM}$. The outer diameter $D_{FCI}$ of the input portion 74 is larger than the outer diameter $D_{FCM}$ of the intermediate portion 76, and the transition therebetween is abrupt so as to define an external annular shoulder 78 part-way along the axial length of the fluid conduit 16. The outer diameter $D_{FCM}$ of the intermediate portion 76 is larger than the main diameter $D_{FCO}$ of the output portion 77, and the transition therebetween takes the form of a tapered region 75. Because of the differences in their respective diameters $D_{FCI}$, $D_{FCM}$ and $D_{FCO}$, the input portion 74, intermediate portion 76 and output portion 77 respectively define individual cylindrical outer surfaces 80, 81, 82. In the illustrated embodiment, the output portion 77 terminates in a frusto-conical tip 79 defining the output end 72 of the fluid conduit 16. As such, the output end 72 is adapted to receive a flexible hose by way of an interference stretch fit. Alternatively (not shown), the frusto-conical tip 79 may be omitted and the output portion 77 may be cylindrical. In the further alternative (not shown) the output portion 77 may include an adapter for removably receiving a conventional luer lock (not shown).

Referring now in particular to FIG. 4B, a fluid passageway 83 extends through the fluid conduit 16 from the input end 70 to the output end 72 thereof. The fluid passageway 83 comprises a first portion 84 having a first diameter $D_{FP1}$, and a second portion 86 having a second diameter $D_{FP2}$, with the first diameter $D_{FP1}$ being substantially larger than the second diameter $D_{FP2}$. The transition between the first portion 84 and the second portion 86 of the fluid passageway 83 takes the form of a tapered portion 88 located in the intermediate portion 76 of the fluid conduit 16, near the output portion 77 of the fluid conduit 16.

FIG. 4B shows various dimensions of the fluid conduit 16, indicated by references $FC_1$ and $FC_2$, $D_{FP1}$ and $D_{FP2}$, and $D_{FCI}$, $D_{FCM}$ and $D_{FCO}$. In an exemplary embodiment, these dimensions are as indicated in the table below:

| Reference | Dimension (inches) |
|---|---|
| $FC_1$ | 0.625 |
| $FC_2$ | 1.000 |
| $D_{FP1}$ | 0.250 |
| $D_{FP2}$ | 0.065 |
| $D_{FCI}$ | 0.438 |
| $D_{FCM}$ | 0.310 |
| $D_{FCO}$ | 0.215 |

Figure 5A:
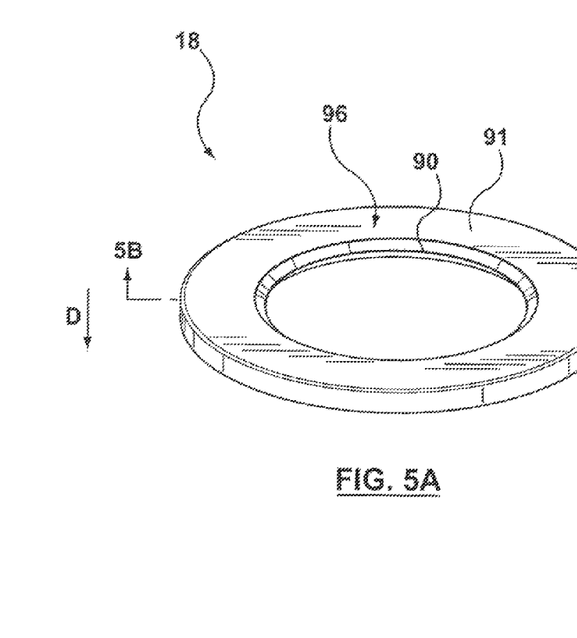
FIG. 5A shows a perspective view of an annular seal of the rotating union of FIG. 1A.
Figure 5B:
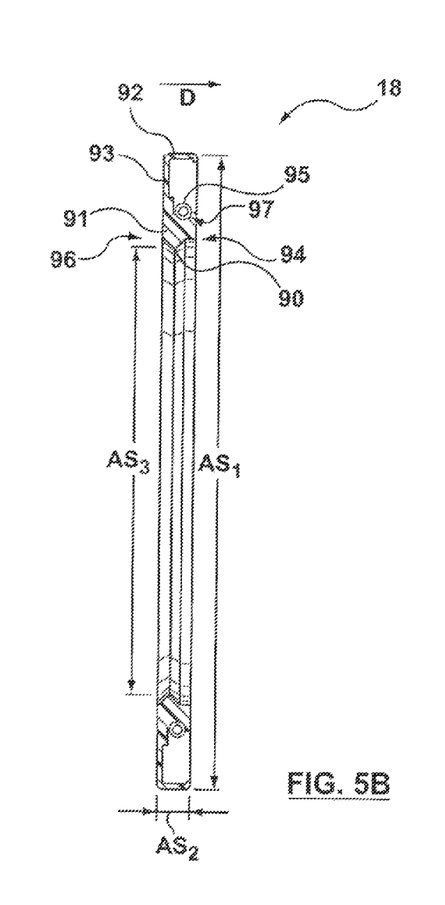
FIG. 5B shows a cross-sectional view of the annular seal of FIG. 5A, taken along the line 5B-5B in FIG. 5A.

Now referring to FIGS. 5A and 5B, a more detailed view of the annular seal 18 is shown. In the illustrated embodiment, as shown particularly in FIG. 5B, the annular seal 18 is a lip seal comprising a flexible inner annular lip 91 and an annular outer seal portion 93 which defines an outer annular engagement surface 92. The inner annular lip 91 defines an inner annular engagement surface 90, and an annular garter spring 95 is received within a channel 97 in the outer annular surface of the inner annular lip 91. When the rotating union 10 is assembled, the garter spring 95 assists in maintaining engagement between the inner annular engagement surface 90 and the cylindrical outer surface 80 of the input portion 74 of the fluid conduit 16 (see FIGS. 4A and 4B). Thus, where the annular seal 18 is a lip seal as in the illustrated embodiment, the annular seal 18 will have a low pressure side 94 and a high pressure side 96 and, when the annular seal 18 is installed in the rotating union 10, the annular seal 18 should be positioned so that the high pressure side 96 is the input side and the low pressure side 94 is the output side, relative to the fluid flow direction D. In an exemplary embodiment, the annular seal 18 has an outer diameter $AS_1$ of 0.688 inches, a thickness $AS_2$ of 0.1250 inches and an inner diameter $AS_3$ of 0.4375 inches, and may be manufactured, for example, by A. W. Chesterton Co. having an address of 500 Unicorn Park Drive, Woburn, Mass., 01801-3345, USA. Other types of seals, such as for example a simple O-ring seal, may also be used in appropriate circumstances.

Figure 6A:
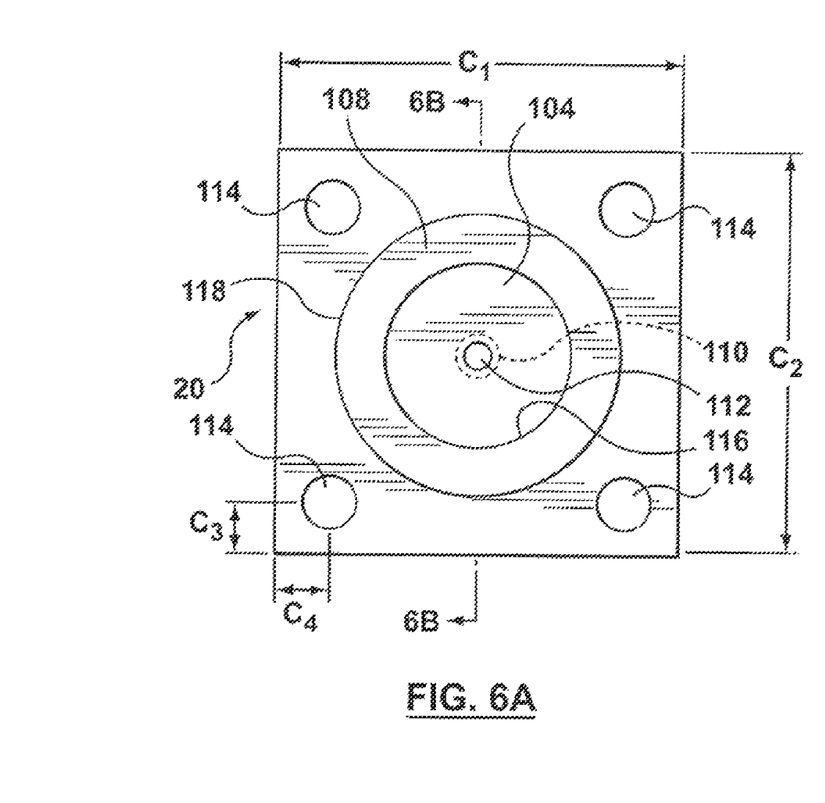
FIG. 6A shows a view from the output end of a cap of the rotating union of FIG. 1A.
Figure 6B:
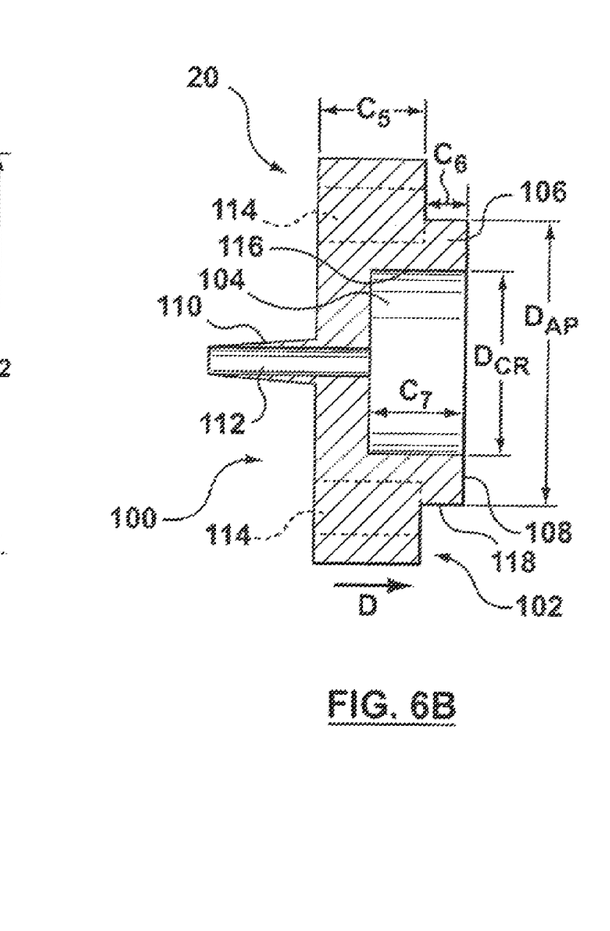
FIG. 6B shows a cross-sectional view of the cap of FIG. 6A, taken along the line 6B-6B in FIG. 6A.

With reference now to FIGS. 6A and 6B, greater detail of the cap 20 is shown. The cap 20 has an input side 100 and an output side 102, relative to the fluid flow direction D. A circular recess 104 having a diameter $D_{CR}$ is defined in the output side 102 of the cap 20 for receiving the input end 70 of the fluid conduit 16, and an annular projection 106 surrounds the circular recess and has an outer diameter $D_{AP}$ corresponding to the diameter $D_{HCR}$ of the housing cylindrical recess 32. The inner diameter of the annular projection 106 is the same as the diameter $D_{CR}$ of the circular recess 104. The annular projection 106 has an engagement surface 108. The input side 102 of the cap 20 is adapted to be coupled to a fluid source so that when the rotating union 10 is assembled, fluid can flow, via the cap 20, into the input end 70 of the fluid conduit 16. More particularly, a tapered fluid input stem 110 projects from the input side of the cap 20 to receive, for example, a flexible hose (not shown) by way of a friction fit or interference stretch fit. A fluid passageway 112 is defined through the fluid input stem 110, and is in fluid communication with the circular recess 104 on the output side 102 of the cap 20. The cap 20 is adapted to be removably and non-rotatably secured to the input end 22 of the housing 12, by way of fasteners 36 (FIGS. 1A and 1C) passing through apertures 114.

FIGS. 6A and 6B show various dimensions of the cap 20, indicated by references $C_1$ to $C_7$, and $D_{CR}$ and $D_{AP}$. In an exemplary embodiment, these dimensions are as indicated in the table below:

| Reference | Dimension (inches) |
|---|---|
| $C_1$ | 0.938 |
| $C_2$ | 0.938 |
| $C_3$ | 0.125 |
| $C_4$ | 0.125 |
| $C_5$ | 0.250 |
| $C_6$ | 0.125 |
| $C_7$ | 0.250 |
| $D_{CR}$ | 0.438 |
| $D_{AP}$ | 0.688 |

Reference is now made to FIG. 7, and the rotating union 10, as assembled, is described.

The bushing 14 is non-rotatably received within the cylindrical recess 32, so that the bushing 14 is fixed relative to the housing 12. For example, the bushing 14 may be friction fit or interference fit in the cylindrical recess 32, and should therefore be sized accordingly. As noted in the tables above, in the exemplary embodiment the outer diameter $D_{BO}$ of the bushing 14 is precisely equal to the diameter $D_{HCR}$ of the housing cylindrical recess 32, so that the cylindrical outer surface 51 of the bushing 14 can engage the cylindrical wall 46 of the cylindrical recess 32 in the housing 12. The output end surface 59 of the bushing 14 will abut the annular shoulder 42 between the cylindrical recess 32 and the bore 40.

The fluid conduit 16 is rotatably received by the bushing 14, and passes through the bushing 14 and the bore 40 in rotatable engagement therewith. More particularly, the cylindrical outer surface 80 of the input portion 74 of the fluid conduit 16 engages the cylindrical wall 60 of cylindrical input end portion 52 of the bushing recess 50, and the cylindrical outer surface 81 of the intermediate portion 76 of the fluid conduit 16 engages both the cylindrical wall 62 of the cylindrical output end portion 54 of the bushing recess 50 and the cylindrical wall 64 of the bore 40. As such, in the exemplary embodiment the diameter $D_{B1}$ of the cylindrical input end portion 52 of the bushing recess 50 and the diameter $D_{FCI}$ of the input portion 74 of the fluid conduit 16 are identical to one another, and the diameter $D_{B2}$ of the output end portion 54 of the bushing recess 50, the diameter $D_{HB}$ of the bore 40 and the diameter $D_{FCM}$ of the intermediate portion 76 of the fluid conduit 16 are identical to one another. Thus, the fluid conduit 16 is supported by the bushing 14 so as to be rotatable within the bushing 14 and the housing 12. The external shoulder 78 on the fluid conduit 16, between the input portion 74 and the intermediate portion 76 thereof, engages the bushing annular shoulder 56. The bushing annular shoulder 56 acts as a stop to limit axial movement of the fluid conduit 16 in the fluid flow direction D, and the intermediate portion 76 extends through and past the bore 40 so that the output end 72 of the fluid conduit 16, and more particularly the output portion 77, are downstream of the bore 40.

The annular seal 18 is received within the housing cylindrical recess 32 at the input end 22 thereof and has its output side 94 supported by the input end surface 58 of the bushing 14. The inner annular engagement surface 90 of the annular seal 18, assisted by the garter spring 95, sealingly engages the cylindrical outer surface 80 of the input portion 74 of the fluid conduit 16 and the outer annular engagement surface 92 of the annular seal 18 sealingly engages the cylindrical wall 46 of the housing cylindrical recess 32 at the input end 22 thereof. Once so assembled, when the fluid conduit 16 rotates within the bushing 14, the cylindrical outer surface 80 of the input portion 74 of the fluid conduit 16 rotates under friction against the inner annular engagement surface 90 of the annular seal 18 so that sealing engagement therebetween is maintained. As such, the outer diameter $AS_1$ (FIG. 5B) of the annular seal 18 is identical to the diameter $D_{HCR}$ of the cylindrical recess 32 in the housing 12, and the inner diameter $AS_3$ (FIG. 5B) of the annular seal 18 is identical to the diameter $D_{FCI}$ of the input portion 74 of the fluid conduit 16. As noted above, the garter spring 95 assists in maintaining sealing engagement between the inner annular engagement surface 90 of the annular seal 18 and the cylindrical outer surface 80 of the input portion 74 of the fluid conduit 16.

The input end 70 of the fluid conduit 16 is received within the circular recess 104 in the output side 102 of the cap 20, and the annular projection 106 surrounds the input end 74 of the fluid conduit 16. More particularly, the cylindrical wall 116 of the circular recess 104 and annular projection 106 engages the cylindrical outer surface 80 of the input portion 74 of the fluid conduit 16. Accordingly, the inner diameter $D_{CR}$ of the circular recess 104 and annular projection 106 is identical to the diameter $D_{FCI}$ of the input portion 74 of the fluid conduit 16.

The outer cylindrical wall 118 of the annular projection 106 engages the cylindrical wall 46 of the housing cylindrical recess 32. As such, the outer diameter $D_{AP}$ (FIG. 6B) of the annular projection 106 is identical to the diameter $D_{HCR}$ of the housing cylindrical recess 32.

The engagement surface 108 on the annular projection 106 sealingly engages the input side 96 of the annular seal 18. When the cap 20 is secured to the input end 22 of the housing 12, such as by fasteners 36, it will cooperate with the housing 12 to maintain the respective axial positions of the annular seal 18, cylindrical bushing 14 and fluid conduit 16 inside the housing 12. More particularly, the bushing 14 is prevented from moving in the fluid flow direction D by abutment of the output end surface 59 of the bushing and the annular shoulder 42 between the cylindrical recess 32 and the bore 40, and the bushing 14 is prevented from moving in a direction opposite the direction D of fluid flow by the combination of the annular seal 18 and the engagement surface 108 on the annular projection 106. The fluid conduit 16 is prevented from moving in the fluid flow direction by abutment of the external shoulder 78 on the fluid conduit 16 with the bushing annular shoulder 56, and is prevented from moving in the direction opposite fluid flow direction D by the cap 20, more particularly the floor of the circular recess 104. The annular seal 18 is axially trapped or "sandwiched" between the engagement surface 108 on the annular projection 106 and the input end surface 58 of the bushing 14.

Figure 8A:
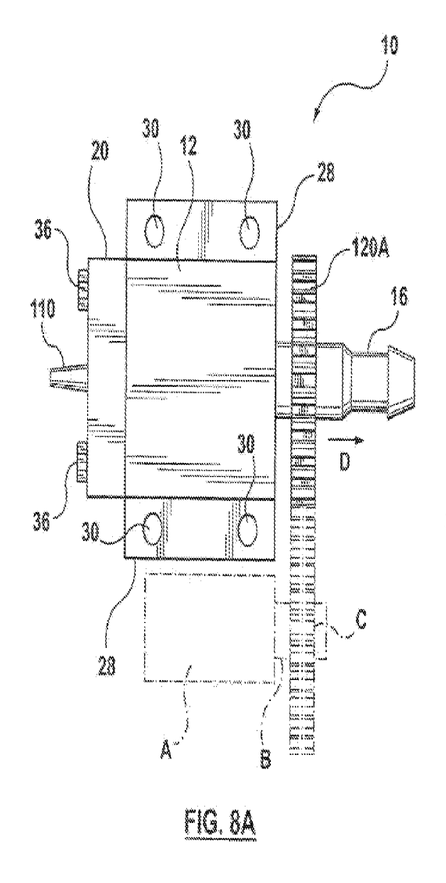
FIG. 8A shows a plan view of the rotating union of FIG. 1A, coupled to a motor in a first driving arrangement.

Optionally, the rotating union 10 is coupled to a rotary motor. Referring now to FIG. 8A, the rotating union 10 is shown in plan view, as it would be mounted to a support (not shown). A rotary motor A having a drive shaft B may be mounted to the support so that the axis of rotation of the drive shaft B is parallel to the fluid flow direction D. A drive wheel, in this case a geared drive wheel 120A, is coaxially fixed to the cylindrical outer surface 81 of the intermediate portion 76 of the fluid conduit 16, and a correspondingly geared drive wheel C is positioned on the drive shaft B of the rotary motor A. The drive wheel C on the drive shaft B of the rotary motor A is drivingly coupled to the drive wheel 120A on the fluid conduit 16 by way of intermeshing outer gear surfaces on the drive wheels 120A, C, so that the rotary motor A is operable to rotate the fluid conduit 16 relative to the housing 12.

Figure 8B:
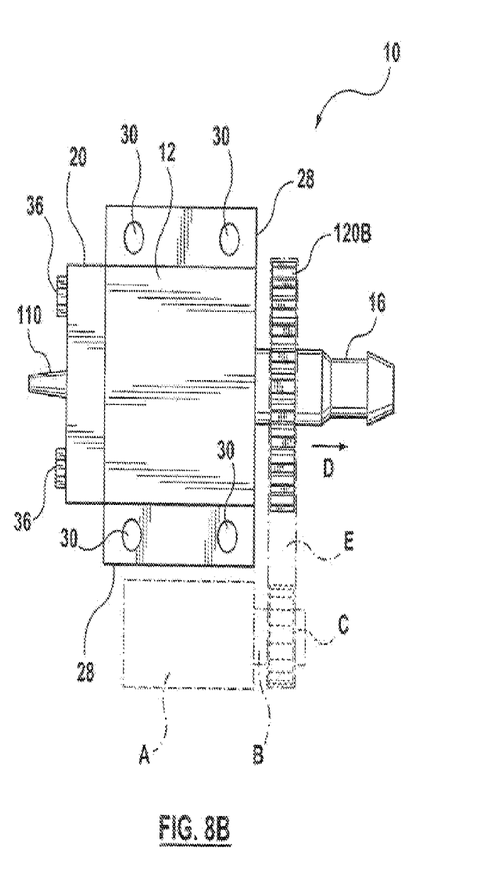
FIG. 8B shows a plan view of the rotating union of FIG. 1A, coupled to a motor in a second driving arrangement.

FIG. 8B shows a similar arrangement to that shown in FIG. 8A, except that the drive wheel C on the drive shaft B of the rotary motor A is drivingly coupled to the drive wheel 120B on the fluid conduit 16 by way of a drive belt E. Other arrangements for driving rotation of the fluid conduit 16, relative to the housing 12 and cap 20, may also be used.

For use in medical applications, the various components of the rotating union 10 must be able to be individually sterilized, such as by autoclaving, and as such, the rotating union 10 can be disassembled by removing the fasteners 36. The housing 12, fluid conduit 16 and cap 18, may be constructed of stainless steel, such as 316 stainless steel, or aluminum, such as 6061T6 aircraft aluminum, or from titanium or from other suitable metals or metal alloys. The bushing 14 may be made from suitable polymers or combinations thereof, including nylon, Delron, Nylatron and Teflon. The annular seal 18 may be made from a food grade Teflon/mineral oil composition, and can be initially sterilized. Because of the presence of the annular garter spring 95, the annular seal 18 should be discarded after each use (rather than re-sterilized) and a new, sterile annular seal 18 installed each time the rotating union 10 is used.

Determination of appropriate materials will depend, at least in part, on weight considerations, which will in turn depend on the size of the rotating union 10. While specific dimensions of a particular embodiment have been described herein, it will be appreciated that a rotating union 10 according to an aspect of the present invention may have different dimensions, depending on the application. It is also to be appreciated that the drawings herein are not necessarily to scale.

One or more currently preferred embodiments have been described by way of example. It will be apparent to persons skilled in the art that a number of variations and modifications can be made without departing from the scope of the invention as defined in the claims.

The table below sets out a listing of the reference numerals used herein, as well as the part identified by that reference numeral, for ease of reference. No limitation is implied by this table.

| Reference | Part |
|---|---|
| 10 | Rotating union (overall) |
| 12 | Housing |
| 14 | Bushing |
| 16 | Fluid conduit |
| 18 | Annular seal |
| 20 | Cap |
| 22 | Input end of housing |
| 24 | Output end of housing |
| 28 | Wing members of housing |
| 30 | Apertures in wing members |
| 32 | Cylindrical recess in housing |
| 34 | End face of housing |
| 36 | Fasteners |
| 40 | Bore in housing |
| 42 | Annular shoulder between cylindrical recess and bore |
| 44 | Receiving holes in housing |
| 46 | Cylindrical wall of housing cylindrical recess |
| 48 | Input end of bushing |
| 49 | Output end of bushing |
| 50 | Coaxial bushing recess |
| 51 | Cylindrical outer surface of bushing |
| 52 | Cylindrical input end portion of bushing recess |
| 54 | Cylindrical output end portion of bushing recess |
| 56 | Bushing annular shoulder between input and output ends |
| 58 | Input end surface of bushing |
| 59 | Output end surface of bushing |
| 60 | Cylindrical wall of input end portion of bushing recess |
| 62 | Cylindrical wall of output end portion of bushing recess |
| 64 | Cylindrical wall of bore |
| 70 | Input end of fluid conduit |
| 72 | Output end of fluid conduit |
| 74 | Input portion of fluid conduit |
| 76 | Intermediate portion of fluid conduit |
| 77 | Output portion of fluid conduit |
| 78 | External annular shoulder between input and intermediate portions of fluid conduit |
| 79 | Frusto-conical tip of fluid conduit |
| 80 | Cylindrical outer surface of input portion of fluid conduit |
| 81 | Cylindrical outer surface of intermediate portion of fluid conduit |
| 82 | Cylindrical outer surface of output portion of fluid conduit |
| 83 | Fluid passageway through fluid conduit |
| 84 | First portion of fluid passageway through fluid conduit |
| 86 | Second portion of fluid passageway through fluid conduit |
| 88 | Tapered portion between first and second portions of fluid passageway through fluid conduit. |
| 90 | Inner annular engagement surface of annular seal |
| 92 | Outer annular engagement surface of annular seal |
| 94 | Output side of annular seal |
| 96 | Input side of annular seal |
| 100 | Input side of cap |
| 102 | Output side of cap |
| 104 | Circular recess in output side of cap |
| 106 | Annular projection surrounding circular recess in cap |
| 108 | Engagement surface on annular projection |
| 110 | Fluid input stem |
| 112 | Fluid input passage |
| 114 | Fastening apertures in cap |
| 116 | Cylindrical wall of circular recess and annular projection |
| 118 | Outer cylindrical wall of annular projection |
| 120A, 120B | Drive wheel on intermediate portion of fluid conduit |
| A | Rotary motor |
| B | Drive shaft of rotary motor |
| C | Drive wheel on drive shaft of rotary motor |
| D | Direction of fluid flow |
| E | Belt |

What is claimed is:

1. A rotating union (10) having an input end and an output end relative to a fluid flow direction (D) therethrough, comprising:

a housing (12), the housing having an input end (22) and an output end (24) relative to the fluid flow direction, the housing having:

a mounting structure (12) for mounting the housing to a support;

a housing cylindrical recess (32) defined in the housing, the housing cylindrical recess opening at the input end of the housing and extending axially along the interior of the housing to terminate at an end face (34) adjacent the output end of the housing, and a bore (40) defined through the end face of the housing at the output end thereof so that the bore is co-axial with the cylindrical recess and communicates therewith;

wherein the bore has a diameter $D_{HB}$ and the housing cylindrical recess has a diameter $D_{HCR}$ that is larger than the bore diameter $D_{HB}$ so that the housing cylindrical recess and the bore cooperate to define an interior surface of the end face as a housing annular shoulder (42) between the bore and the housing cylindrical recess;

a cylindrical low-friction bushing (14) received within the housing cylindrical recess, the bushing having an input end (48) and an output end (49) relative to the fluid flow direction and having a co-axial bushing recess (50) defined therein, the bushing recess comprising a cylindrical input end portion (52) having a first diameter $D_{B1}$ and a cylindrical output end portion (54) having a second diameter $D_{B2}$, with $D_{B1}$ being larger than $D_{B2}$ so as to define a bushing annular shoulder (56) between the input end portion and the output end portion of the bushing recess, the bushing having an output end surface (59) abutting the housing annular shoulder;

a fluid conduit (16) having an input end (70) and an output end (72) relative to the fluid flow direction and passing through the bushing and the bore in rotatable engagement therewith, wherein:

the output end of the fluid conduit is downstream of the bore, relative to the fluid flow direction;

the fluid conduit is supported by the bushing so as to be rotatable within the bushing; and the fluid conduit has an external shoulder (78) defined part-way along its axial length which engages the bushing annular shoulder;

an annular seal (18) having an input side (96) and an output side (94) relative to the fluid flow direction, the annular seal being received within the housing cylindrical recess at the input end thereof and having its output side (94) engaging an input end surface (58) of the bushing, an inner annular engagement surface (90) of the annular seal sealingly engaging a cylindrical outer surface (80) of an input portion (74) of the fluid conduit and an outer annular engagement surface (92) of the annular seal sealingly engaging a cylindrical wall (46) of the housing cylindrical recess at the input end thereof; and a cap (20) having an input side (100) and an output side (102) relative to the fluid flow direction, the cap having:

a circular recess (104) defined in the output side of the cap for receiving the input end of the fluid conduit in rotatable engagement therewith;

an annular projection (106) surrounding the circular recess and having an outer diameter $D_{AP}$ corresponding to a diameter $D_{HCR}$ of the housing cylindrical recess, an engagement surface (108) of the annular projection sealingly engaging the input side (96) of the annular seal;

wherein the input side of the cap is adapted to be coupled to a fluid source so that fluid can flow, via the cap, into the circular recess and into the input end of the fluid conduit, and the cap is removably and non-rotatably secured to the input end of the housing so as to maintain respective axial positions of the annular seal, cylindrical bushing and fluid conduit inside the housing;

whereby when the fluid conduit rotates within the bushing, the cylindrical outer surface of the input portion of the fluid conduit rotates under friction against the inner annular engagement surface of the annular seal so that sealing engagement therebetween is maintained.

2. The rotating union of claim 1 further comprising a fluid conduit drive wheel (120A, 120B) coaxially fixed to an outer surface of the fluid conduit at a position downstream from the output end of the housing.

3. The rotating union of claim 2, wherein a rotary motor (A) having a drive shaft (B) whose axis of rotation is parallel to the fluid flow direction has a motor drive wheel (C) that is drivingly coupled to the fluid conduit drive wheel so that the rotary motor is operable to rotate the fluid conduit relative to the housing.

4. The rotating union of claim 3, wherein the motor drive wheel is drivingly coupled to the fluid conduit drive wheel by a belt (E).

5. The rotating union of claim 3, wherein the motor drive wheel and the fluid conduit drive wheel have intermeshing outer gear surfaces.

6. The rotating union of claim 1, wherein the bushing is non-rotatably received within the cylindrical recess.

7. The rotating union of claim 6, wherein the fluid conduit comprises the input portion, the input portion having an outer diameter $D_{FCI}$, an output portion (77) and an intermediate portion (76) disposed between the input portion and the output portion and having an outer diameter $D_{FCM}$ and wherein the outer diameter $D_{FCI}$ of the input portion is larger than the outer diameter $D_{FCM}$ of the intermediate portion and the transition therebetween is abrupt so as to define the external annular shoulder on the fluid conduit.

8. The rotating union of claim 1, wherein the cap includes a fluid input stem (110) projecting from the input side and a fluid passageway (112) defined through the fluid input stem which is in fluid communication with the circular recess.

9. The rotating union of claim 1, wherein the output end of the fluid conduit is adapted to receive a luer lock.

10. The rotating union of claim 1, wherein the bushing is a polymer bushing.

11. The rotating union of claim 1, wherein the annular seal is a lip seal having a high pressure side, the high pressure side facing the input end of the housing.

* * * * *